(12) United States Patent
Wenger (10) Patent No.: US 8,255,879 B2
(45) Date of Patent: Aug. 28, 2012

(54) METHOD AND APPARATUS FOR IMPROVING A SOFTWARE PRODUCT

(75) Inventor: Joseph Wenger, Grapevine, TX (US)

(73) Assignee: CA, Inc., Islandia, NY (US)

( * ) Notice: Subject to any disclaimer, the term of this patent is extended or adjusted under 35 U.S.C. 154(b) by 821 days.

(21) Appl. No.: 11/130,930

(22) Filed: May 17, 2005

(65) Prior Publication Data

US 2006/0048102 A1 Mar. 2, 2006

Related U.S. Application Data

(60) Provisional application No. 60/571,774, filed on May 17, 2004.

(51) Int. Cl.
*G06F 9/44* (2006.01)

(52) U.S. Cl. ....................................... 717/130

(58) Field of Classification Search .................. 717/100, 717/101, 103, 120, 121, 123, 127, 128, 131, 717/168, 171

See application file for complete search history.

(56) References Cited

U.S. PATENT DOCUMENTS

| 5,265,254 | A | * | 11/1993 | Blasciak et al. ............... 717/130 |
| 5,828,883 | A | | 10/1998 | Hall ............................ 395/704 |
| 5,918,004 | A | * | 6/1999 | Anderson et al. ............... 714/38 |
| 6,126,330 | A | * | 10/2000 | Knight ......................... 717/127 |
| 6,189,142 | B1 | * | 2/2001 | Johnston et al. .............. 717/125 |
| 6,220,768 | B1 | * | 4/2001 | Barroux ........................ 709/224 |
| 6,611,723 | B1 | * | 8/2003 | Kehrer et al. .................. 700/26 |
| 2004/0098478 | A1 | * | 5/2004 | Koetke et al. ................. 709/224 |
| 2004/0221033 | A1 | * | 11/2004 | Davis et al. ................... 709/224 |
| 2004/0249914 | A1 | * | 12/2004 | Flocken et al. ............... 709/223 |
| 2004/0249937 | A1 | * | 12/2004 | Tachihara et al. ............. 709/224 |
| 2005/0097517 | A1 | * | 5/2005 | Goin et al. .................... 717/124 |
| 2005/0154557 | A1 | * | 7/2005 | Ebert ............................ 702/182 |
| 2005/0174961 | A1 | * | 8/2005 | Hrastar ........................ 370/328 |
| 2005/0203881 | A1 | * | 9/2005 | Sakamoto et al. ............... 707/3 |
| 2006/0179431 | A1 | * | 8/2006 | Devanathan et al. ......... 717/168 |

FOREIGN PATENT DOCUMENTS

| WO | WO 95/27249 | 10/1995 |
| WO | WO 00/72151 A1 | 11/2000 |

OTHER PUBLICATIONS

Notification of Transmittal of the International Search Report for application PCT/US2005/016995 (8 pages), Sep. 30, 2005.
Written Opinion of the International Searching Authority for application PCT/US2005/016995 (6 pages), Sep. 30, 2005.
IBM Technical Disclosure Bulletin; XP-000312915; Dekovert V Program for OS/2 Memory-Mapped Performance Hooks; vol. 35, No. 5, pp. 150 to 152, Oct. 1992.

* cited by examiner

*Primary Examiner* — Philip Wang
(74) *Attorney, Agent, or Firm* — Baker Botts L.L.P.

(57) ABSTRACT

Methods and apparatuses for improving a software product are provided. A method for improving a software product includes collecting tracking data through tracking markers inserted at respective functional points of the software product, storing the collected tracking data in a repository, and retrieving the tracking data from the repository and analyzing the tracking data to determine changes for improving the software product.

43 Claims, 5 Drawing Sheets

- Client Site ID
- Client Host System ID
- Vendor Product ID
- Vendor Release Level
- Vendor Module/Program ID
- Vendor Maintenance Applied
- Vendor Module/Program Marker Location
- Vendor Marker ID
- Time & Date Stamp of Marker Activity
  ...
- I/O volumes and rates
- Storage utilized
- Elapsed time of processes
- Activity rates
- etc.

METHOD AND APPARATUS FOR IMPROVING A SOFTWARE PRODUCT

CROSS REFERENCE TO RELATED APPLICATION

The present application claims the benefit of U.S. provisional application Ser. No. 60/571,774, filed May 17, 2004.

TECHNICAL FIELD

The present disclosure relates to product performance and utilization and, more specifically, to techniques for improving a software product by tracking product performance and utilization trends.

DESCRIPTION OF THE RELATED ART

In the endeavor to continuously improve a product (for example, a computer software product), it is increasingly important to obtain accurate feedback as to performance of the product.

One approach to product improvement is to conduct product testing at the vendor site. While vendor-site testing may be a useful approach to testing the effectiveness of a product, many of the issues faced by clients at client-sites may not be brought to light during vendor-site testing.

Another approach is to employ beta testing. In beta testing, a pre-release version of a product is released to a limited number of beta testers. The product may then be utilized by the beta testers at the beta test-sites. Detailed feedback may then be provided from the beta testers to the vendor which may help for correction of problems and development of improvements, prior to general release of the product. Beta testing may continue after the product has been released, to obtain additional information that may be used to improve the product and/or subsequent versions of the product.

However, a drawback of beta testing is that the scope of the testing is typically limited to a small set of beta testers. Broad based testing has generally been impracticable due to such factors as unacceptable costs and lack of detailed feedback from clients.

Client feedback, often in the form of trouble areas and/or suggested improvements, can be a useful tool in product improvement. However, there is a need for a broader base of detailed feedback. This feedback may then be used to develop product improvements that are more responsive to the needs of the clients.

SUMMARY

This application describes methods, apparatuses and systems for improving a software product.

A method for improving a software product, according to one exemplary embodiment, includes activating tracking markers inserted at respective functional points of the software product, collecting through the tracking markers tracking data corresponding to operation of the software product, during the operation of the software product, using the collected tracking data to generate activity records, writing the activity records corresponding to the collected tracking data to a repository, and sending the activity records from the repository to a destination for determining improvements to the software product.

According to another exemplary embodiment, a method for improving a software product includes collecting tracking data through tracking markers inserted at respective functional points of the software product, storing the collected tracking data in a repository, and retrieving the tracking data from the repository and analyzing the tracking data to determine changes for improving the software product.

An apparatus for improving a software product, according to one exemplary embodiment, includes a repository, one or more tracking markers, and a tracking data analyzer. The tracking markers are inserted at one or more functional points within the software product, to collect tracking data while the software product is in operation, and deposit the collected tracking data into the repository. The tracking data analyzer analyzes the collected tracking data to determine performance and utilization trends.

The application also describes methods, apparatuses and systems for assessing product performance.

A method for assessing product performance of a software product, according to one exemplary embodiment, includes collecting performance data at one or more functional points within the software product, storing the collected performance data in a central repository, and communicating the stored data to a location where the stored data is analyzed.

An apparatus for assessing product performance of a software product, according to one exemplary embodiment, includes one or more markers for collecting performance data at one or more functional points within the software product, and a central repository for storing the collected performance data. The stored data can be communicated over a network to a location where the stored data is analyzed.

The methods, apparatuses and systems of this disclosure may be embodied in one or more computer programs stored on a computer readable medium or program storage device and/or transmitted via a computer network or other transmission medium in one or more segments or packets.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure provides tools (in the form of methodologies, apparatuses, and systems) for improving a software product.

The following exemplary embodiments are set forth to aid in an understanding of the subject matter of this disclosure, but are not intended, and should not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1:
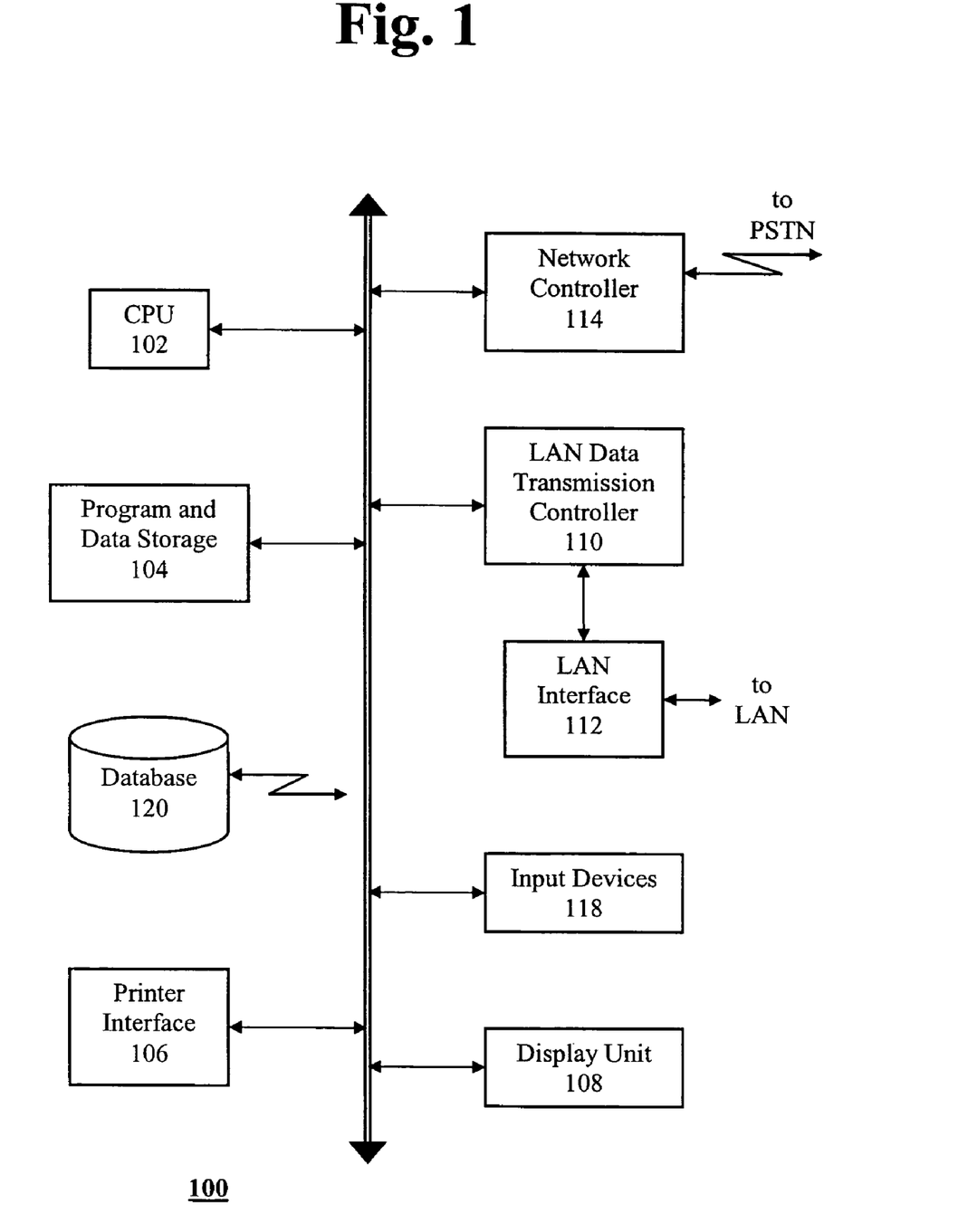
FIG. 1 shows a block diagram of an exemplary computer system capable of implementing the methods and apparatuses of the present disclosure.

FIG. 1 shows an example of a computer system 100 which can implement the methods and apparatuses of the present disclosure. The apparatuses and methods of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a computer network, (for example, a local area network, the Internet, etc.) or another transmission medium. Alternatively, the apparatuses and methods of this application, as will be apparent to one skilled in the art after reading this disclosure, can be implemented in hardware or firmware.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 may be connected to a database 120, via a link 122.

Techniques for improving a software product are discussed below.

Figure 2:
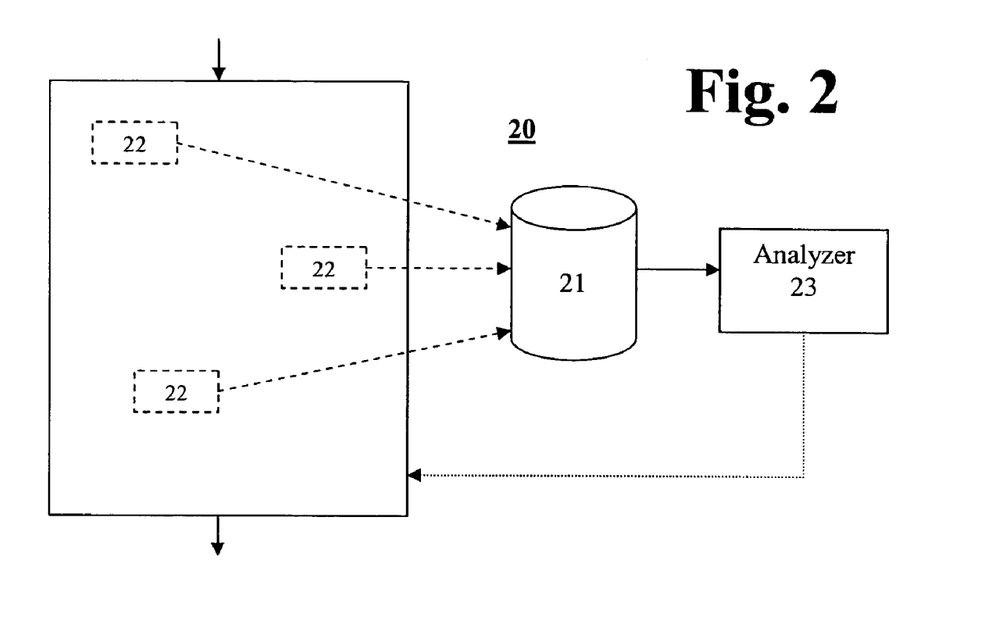
FIG. 2 shows a block diagram illustrating an apparatus for improving a software product, according to an exemplary embodiment of the present disclosure.
Figure 3:
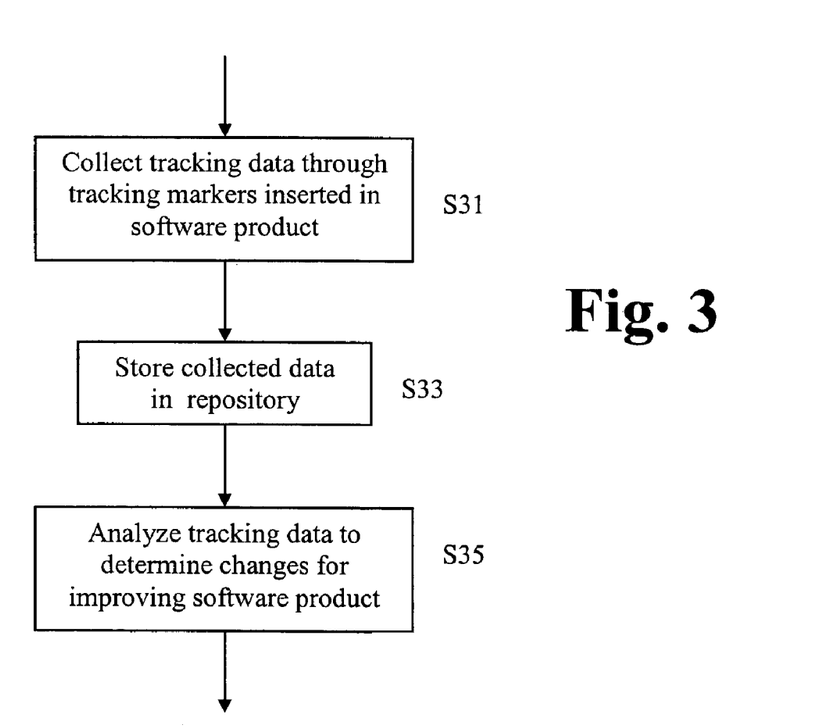
FIG. 3 shows a flow chart illustrating a method for improving a software product, according to the embodiment of FIG. 2.

An exemplary embodiment is discussed below with reference to FIGS. 2 and 3. An apparatus 20 for improving a software product, according to an embodiment, includes a repository 21, one or more tracking markers 22, and a tracking data analyzer 23. The tracking markers 22 are inserted at one or more functional points within the software product 25, to collect tracking data while the software product is in operation, and deposit the collected tracking data into the repository 21. The tracking data analyzer 23 analyzes the collected tracking data to determine performance and utilization trends.

A tracking marker 22 can be a module configured to collect predetermined types of data during operation of the software module, and collection of tracking data by the tracking marker can be specified by logic included in the software product, for the tracking marker, and/or initiated by user action. The tracking markers can operate continuously to collect the tracking data.

The tracking data stored in repository 21 can include product performance data, product activity data, utilization data, etc.

The tracking data analyzer 23 can analyze the collected tracking data to acquire performance and utilization statistics, and/or determine improvements for the software product A method for improving a software product can include collecting tracking data through the tracking markers 22 inserted at respective functional points of the software product 25 (step S31), storing the collected tracking data in the repository 21 (step S33), and retrieving the tracking data from the repository 21 and analyzing the tracking data with the analyzer 23 to determine changes for improving the software product 25 (step S35).

Collection of tracking data by a tracking marker can be automated, and/or specified by logic included in the software product, for the tracking marker.

The method may further include (a) activating the tracking markers, wherein the activation of a tracking marker is specified by logic included in the software product, for the tracking marker, and/or triggered by user action, (b) analyzing the tracking data to acquire performance and utilization statistics, and the performance and utilization statistics are used to improve the software product, (c) communicating the tracking data to a product vendor over a network prior to analysis of the tracking data, wherein the analysis of the tracking data is performed by the product vendor, and/or (d) generating one or more activity records by using the collected tracking data, and storing the one or more activity records in the repository.

Figure 4:
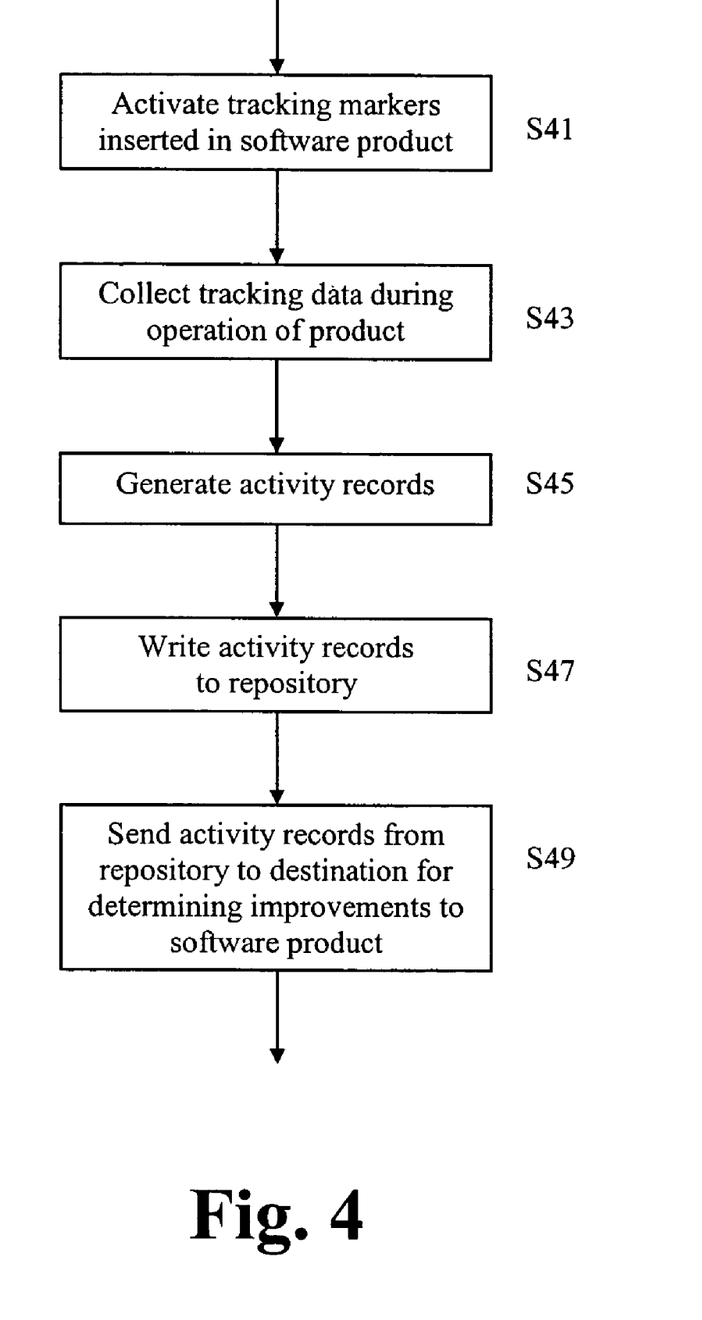
FIG. 4 shows a flow chart illustrating a method for improving a software product, according to another embodiment.

A method for improving a software product, according to another exemplary embodiment (FIG. 4), includes activating tracking markers inserted at respective functional points of the software product (step S41), collecting through the tracking markers tracking data corresponding to operation of the software product during the operation of the software product (step S43), using the collected tracking data to generate activity records (step S45), writing the activity records corresponding to the collected tracking data to a repository (step S47), and sending the activity records from the repository to a destination for determining improvements to the software product (step S49). The method may further include analyzing statistically a plurality of the activity records to determine performance and utilization trends.

The software product can be host system software and the tracking marker collects host system performance data. The activity record containing the host system performance data can include host system identifying information identifying the host system software.

Activity records can include (i) date and timestamp information identifying the date and time at which corresponding tracking data was collected, (ii) marker location information identifying a location in the software product of a tracking marker which collected the corresponding tracking data of the activity record, and/or (iii) a marker description describing the tracker marker which collected the corresponding tracking data of the activity record. In addition, activity records can optionally include product error statistics, input/output statistics, storage utilization information, as well as various other types of information. The activity information in an activity record can describes software execution activity during code execution at the corresponding functional point in the software product.

A method for assessing product performance, according to an exemplary embodiment, includes collecting performance data at one or more functional points within the product, storing the collected performance data in a central repository, and communicating the stored data to a location where the stored data may be analyzed.

The collection of the performance data can be performed by one or more markers inserted at one or more functional points within the product. Collection of performance data can be initiated automatically, by a user, by logic incorporated into the software product, and/or by a product vendor, and can be performed continuously.

The collected data can comprise activity data, identification data, tracking data, etc., can be stored in one or more activity records in the repository and/or in a compressed format, can be communicated to a product vendor (for example, over a wide area network, a local area network, the Internet, etc., and via FTP or email), and can be analyzed by the product vendor (or another) for performance and utilization statistics and/or for improvements to the product.

An apparatus for assessing product performance, according to an exemplary embodiment, includes one or more markers for collecting performance data at one or more functional points within the product, a central repository for storing the collected performance data, and a communications network for communicating the stored data to a location where the stored data may be analyzed.

The apparatus can additionally include an analyzing unit for analyzing the collected data, for example, to determine performance and/or utilization trends, and/or improvements to the product.

As indicated above, one of the steps in the process for improving a product is to collect, preferably using an automated process, a wide range of data pertaining to performance and utilization of the product at client-sites. As discussed herein, tracking markers can be inserted at functional points in the product, and used to collect tracking data (for example, performance and utilization data). Collected data may then be forwarded to the vendor for analysis and/or review, or automatically (and/or periodically) analyzed using a smart analyzer.

Tracking data may relate to, for example, utilization review, capacity planning and/or functional flow tracking in a product. Tracking data may include information pertaining to a marker as established during the placement of the marker into the product. Tracking data may include host system level information indicating host system performance placement of product. Tracking data may include host system identification information (for example, the operating system in use by the host system and other information that identifies the platform of the host system). Tracking data may include statistics relating to errors that are encountered during operation of the product. Tracking data may include input/output (I/O) statistics. Tracking data may include storage utilization information. Tracking data may include a wide range of other data that may be pertinent to the performance of the product (for example, information that pertains to a particular marker location as described below).

As another example, tracking data can include activity data that describes what is actually occurring during operation of the product at specific points.

The collected data can also include identification information. The identification information can include information describing data that has been collected, such that collected data can properly (and quickly) be identified. The identification information can also identify the client site, for example, by specifying a particular client and/or a particular client facility where the product is utilized. The identification information can include client host system identification, such as an indicator specifying a particular system in which the product is installed. The identification information can include product identification, for example, specifying the particular product for or from which data is being collected. Since a client may have multiple products from a particular vendor installed on their systems, data relating to multiple products may be collected concurrently. The identification information can also specify release level (for example, the particular version and/or update/patch implementation of the product) and/or maintenance applied (for example, patches and/or updates that have been applied to the product, customizations and settings applied to the product, etc.). The identification information can include, in addition, module/program identification (for example, specifying a particular module and/or program within a product to which collected data relates), marker identification (for example, specifying the identity of the particular marker that has collected the data), and module/program marker location (for example, identifying a particular location within a particular module or program where a marker has been placed, and hence, from where the data has been collected). The identification information can include date and time stamp of marker activity (for example, indicating the date and time at which the marker collected the data). The identification information can also include a wide range of other indicators that may contribute to identifying a context for collected data.

According to some embodiments, logic for initializing monitoring of product processes may be incorporated into the product. Tracking markers may be placed at specific functional points within the product.

Figure 5:
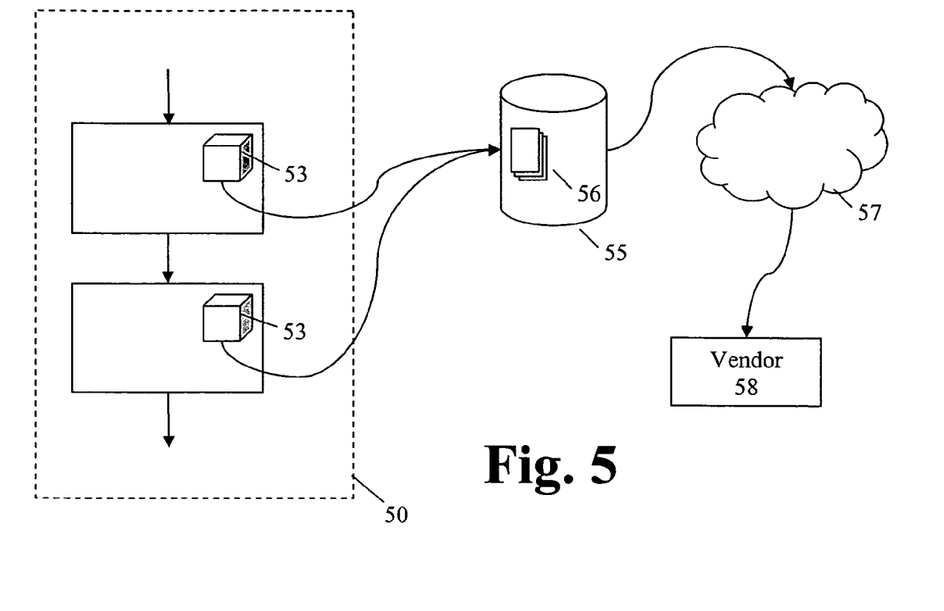
FIG. 5 is a block diagram showing a system for collecting data, according to an exemplary embodiment of the present disclosure.

FIG. 5 is a block diagram showing a system for collecting data, according to an exemplary embodiment. Product 50 (for example, a software product) may contain multiple functional points within the product where events or consequence occur. For example, functional points may be inserted in modules, objects, functions, processes, etc., within the product. On the other hand, functional points may be events that occur during product use. Tracking markers 53 may be placed at one or more of the multiple functional points.

The markers 53 may be objects, program elements, units of code, processes, daemons, etc., that monitor functional points to collect pertinent data, for example, tracking data, activity data, etc. The markers may monitor data continuously, intermittently or when triggered to do so, and may collect data automatically and/or upon request from the client and/or the vendor. The markers may collect data actively or passively. For example, the markers may record data during operation of the product (such as execution time). As another example, a marker may actively ask a user for user feedback.

Figure 6:
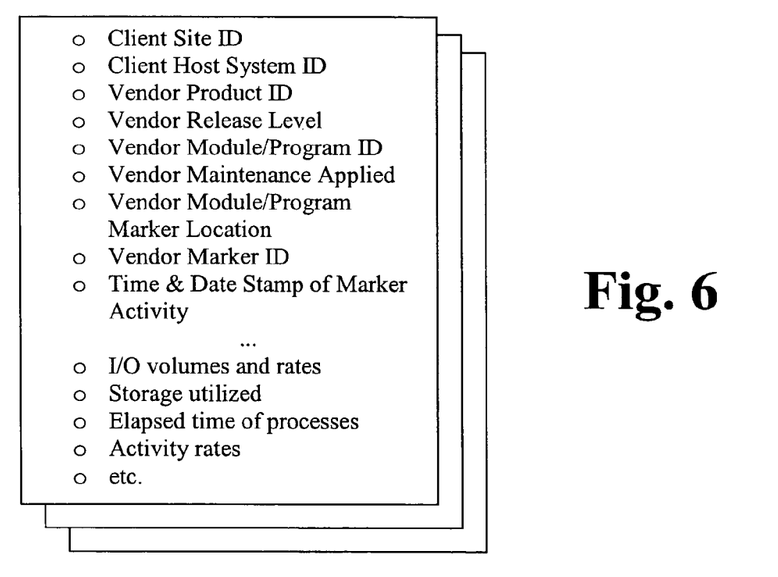
FIG. 6 is a schematic diagram showing an example of an exemplary activity record.

Markers can send collected data (for example, tracking data, activity data, etc.) to the repository 55. The repository may be at the client-site. A single repository may be used for each client, for each client-site, for each vendor and/or for each product. Collected data may be stored in one or more external files within the repository. Collected data may be stored as a series of activity records 56. For example, single activity record may be stored for each marker for each time the marker records data. Alternatively, data may be stored in the repository in another form (for example, optimized for statistically analyzing the stored data). FIG. 6 shows schematically an example of an activity record according to an exemplary embodiment.

Stored data may be encapsulated and/or compressed for efficient storage and/or communication. Additionally, data stored in the repository 55 may be accessible to the client for the client's information and/or use.

In addition to storing collected data, the repository 55 (or another repository) may be used to store one or more control files. The control files may be used to store and relay operational options, for example, options concerning the collection and communication of data.

Collected data may then be recovered by vendor 58 for analysis. Various methods may be used to allow the vendor to recover collected data. Collected data, for example, in the form of activity records 56, may be periodically sent to the vendor, such as over a network 57, via email or via FTP. Alternatively, the activity records may be transmitted over a virtual private network or an alternative form of secure connection. According to another embodiment, the activity records may be sent to the vendor 58 across a local area network or wide area network.

Collected data may be "pushed" to the vendor as it is collected (for example, transfer of data is initiated at the client-site). Email or FTP may be used to push collected data. In some instances, collected data may be pushed when a certain volume of data has been collected.

According to another embodiment, collected data may be "pulled" to the vendor at the vendor's request (for example, transfer of data is initiated at the vendor-site). In some instances, collected data may be pulled when the vendor is interested in perfuming analysis on the data.

The data may be received by a development module and/or group on the vendor side. Where multiple copies of multiple products are implemented at client-sites world-wide, data from multiple client-sites may be received, for example, at a single site. The data may then be analyzed to determine how the product functions in the client-site. In conducting the analysis, the product's response to the client's environment may be clearly understood. Additionally, utilization review, capacity planning and functional flow tracking may all be performed on the recovered data.

Tracking markers may be embedded at various functional points within the product during compilation. Alternatively, the markers may be inserted at the functional points during operation of the product. The product may then be installed at the client-site. The markers may contain logic appropriate for the process or location that the vendor has a particular interest in monitoring, for example for later development.

Figure 7:
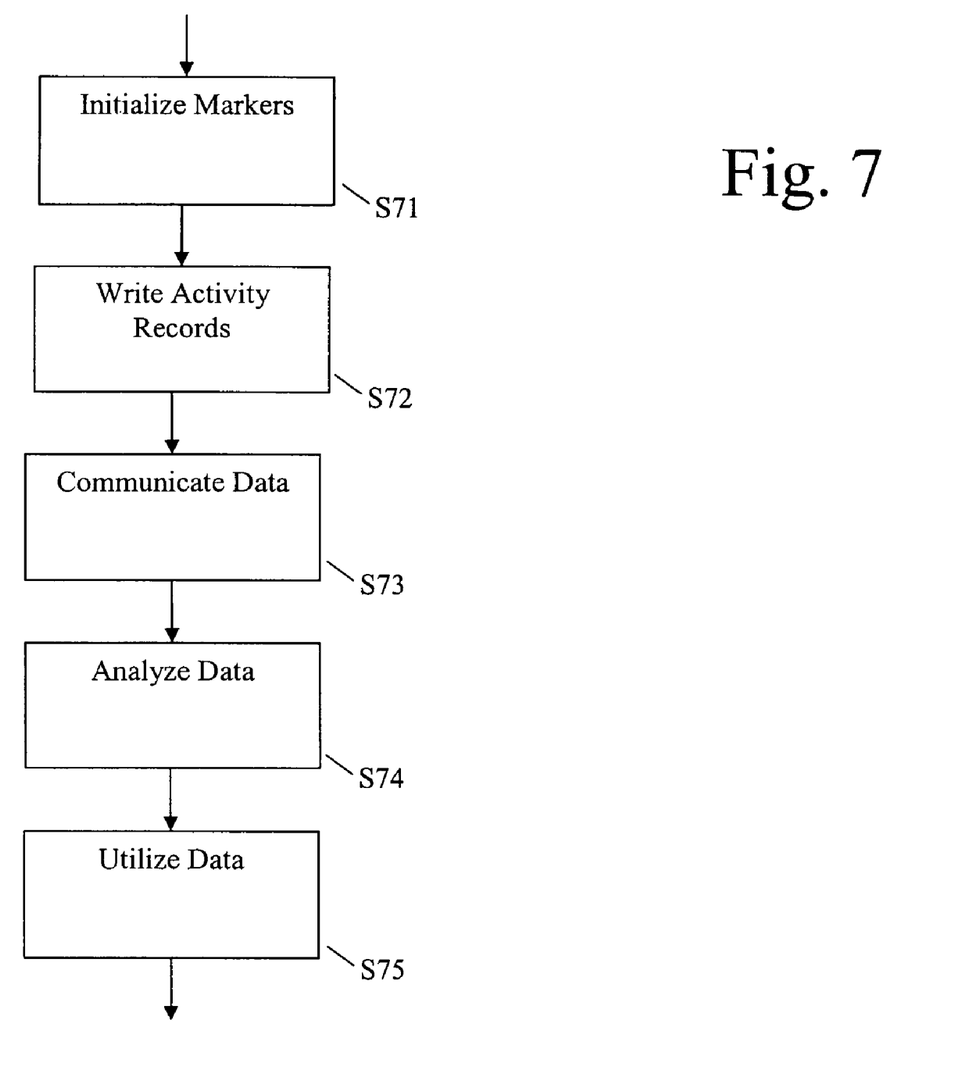
FIG. 7 is a flow chart illustrating a method for collecting and analyzing data according to an exemplary embodiment.

FIG. 7 is a flow chart illustrating a method for collecting and analyzing data according to an embodiment of the present disclosure. The markers may be initialized (Step S71). Initialization of markers activates the data collection process. This step may be executed, for example, by a predefined schedule, periodically, manually (for example by the client or by the vendor) and/or according to volume (for example based on a predefined number of transactions). Predefined values and other adjustable parameters may be read from the control file. Once markers are initialized, data collection may begin.

Collected data may then be written to files, for example activity records (Step S72), for example, within the repository. When data is to be recovered, for example as described above, the data may be communicated to the vendor (Step S73), for example as described above.

The vendor may then have the data analyzed (Step S74), for example as described above. Analyzed data may then be utilized (Step S75) to improve the product or subsequent versions of the product.

The specific embodiments discussed herein are illustrative, and many additional modifications and variations can be introduced on these embodiments without departing from the spirit of the disclosure or from the scope of the appended claims. For example, elements (such as steps) and/or features of different illustrative embodiments may be combined with each other and/or substituted for each other within the scope of this disclosure and appended claims.

Additional variations may be apparent to one of ordinary skill in the art from reading U.S. provisional application Ser. No. 60/571,774, filed May 21, 2004, the entire contents of which are incorporated herein by reference.

What is claimed is:

1. A method for improving a software product, said method comprising:
   in accordance with a predefined value read from a control file stored at a client site, activating tracking markers inserted at respective functional points of the software product, the predefined value identifying when to activate the tracking markers to initiate a data collection process;
   after releasing the software product for use at on the client site, collecting through the tracking markers tracking data corresponding to operation of the software product, the tracking data collected during the operation of the software product on a client system located at the client site, the tracking data including data identifying the client site and data identifying customizations or setting applied to the released software product at the client site, the tracking data further identifying an update comprising a software patch that has been applied to the software product since the software product was released by a vendor and installed on the client system at the client site;
   using the collected tracking data to generate activity records;
   writing the activity records corresponding to the collected tracking data to the repository; and
   sending the activity records from the repository to a vendor site for determining improvements to the software product.

2. The method of claim 1, further comprising analyzing statistically a plurality of the activity records to determine performance and utilization trends.

3. The method of claim 1, wherein the tracking marker is a module configured to collect predetermined types of data during operation of the software module.

4. The method of claim 1, wherein the software product is host system software and the tracking marker collects host system performance data.

5. The method of claim 4, wherein the activity record containing the host system performance data also includes host system identifying information identifying the host system software.

6. The method of claim 4, wherein the host system performance data identifies the type of operating system used on the client system.

7. The method of claim 1, wherein each activity record includes date and timestamp information identifying the date and time at which corresponding tracking data was collected.

8. The method of claim 1, wherein each activity record includes marker location information identifying a location in the software product of a tracking marker which collected the corresponding tracking data of the activity record.

9. The method of claim 1, wherein each activity record includes a marker description describing the tracker marker which collected the corresponding tracking data of the activity record.

10. The method of claim 1, wherein at least one of the activity records includes product error statistics.

11. The method of claim 1, wherein at least one of the activity records includes input/output statistics.

12. The method of claim 1, wherein at least one of the activity records includes storage utilization information.

13. The method of claim 1, wherein the activity information in at least one of the activity records describes software execution activity during code execution at the corresponding functional point in the software product.

14. The method claim 1, wherein the tracking data further includes data selected from the group consisting of:
   data identifying the client site;
   data identifying a client organization or a client facility;
   data identifying a particular client system;
   data identifying the released software product for which data is being collected;
   data identifying a release level or version of the released software product;

data identifying customizations or setting applied to the released software product at the client site; and data identifying a particular module within the released software product.

15. The method of claim 1, wherein the tracking markers actively collect data during the operation of the released software product.

16. The method of claim 1, wherein the activity records are sent from the client site to a vendor site in response to a request received from the vendor, the transfer of activity records from the client site initiated by the vendor.

17. The method of claim 1, wherein the tracking data identifies the client site by identifying a client facility where the product is utilized.

18. The method of claim 1, further comprising:

during the operation of the software product on the client system, actively requesting a user of the client system for user feedback.

19. A computer system, comprising:

a processor; and a program storage device readable by the computer system, tangibly embodying a program of instructions executable by the processor to:

in accordance with a predefined value read from a control file stored at a client site, activate tracking markers inserted at respective functional points of the software product, the predefined value identifying when to activate the tracking markers to initiate a data collection process;

after releasing the software product for use at the client site, collect through the tracking markers tracking data corresponding to operation of the software product, the tracking data collected during the operation of the software product on a client system located at the client site, the tracking data including data identifying the client site and data identifying customizations or setting applied to the released software product at the client site, the tracking data further identifying an update comprising a software patch that has been applied to the software product since the software product was released by a vendor and installed on the client system at the client site;

use the collected tracking data to generate activity records;

write the activity records corresponding to the collected tracking data to the repository; and send the activity records from the repository to a vendor site for determining improvements to the software product.

20. A program storage device readable by a machine, tangibly embodying a program of instructions executable by the machine to:

in accordance with a predefined value read from a control file stored at a client site, activate tracking markers inserted at respective functional points of a software product, the predefined value identifying when to activate the tracking markers to initiate a data collection process;

after releasing the software product for use at the client site, collect through the tracking markers tracking data corresponding to operation of the software product, the tracking data collected during the operation of the software product on a client system located at the client site, the tracking data including data identifying the client site and data identifying customizations or setting applied to the released software product at the client site, the tracking data further identifying an update comprising a software patch that has been applied to the software product since the software product was released by a vendor and installed on the client system at the client site;

use the collected tracking data to generate activity records;

write the activity records corresponding to the collected tracking data to a repository; and send the activity records from the repository to a vendor site for determining improvements to the software product.

21. A method for improving a released software product, said method comprising the steps of:

(a) in accordance with a predefined value read from a control file stored at a client site, activating the tracking markers, the predefined value identifying when to activate the tracking markers to initiate a data collection process;

(b) collecting tracking data through tracking markers inserted at respective functional points of the released software product, said tracking data being collected while the software product is in operation at the client site, the tracking data including data identifying the client site and data identifying an update comprising a software patch applied to the released software product at the client site after the software product was released by a vendor and installed on a client system at the client site;

(c) storing the tracking data collected in step (b) in the repository; and (d) retrieving the tracking data from the repository and analyzing the tracking data to a vendor site to determine changes for improving the software product.

22. The method of claim 21, wherein collection of the tracking data in step (b) is automated.

23. The method of claim 21, wherein collection of tracking data by a tracking marker is specified by logic included in the software product, for the tracking marker.

24. The method of claim 21, further comprising:

(e) analyzing the tracking data to acquire performance and utilization statistics; and (f) using the performance and utilization statistics improve the software product.

25. The method of claim 21, further comprising:

(e) communicating the tracking data to a product vendor over a network prior to analysis of the tracking data in step (d), and wherein the analysis of the tracking data in step (d) is performed by the product vendor.

26. The method of claim 21, further comprising:

(e) generating one or more activity records by using the tracking data collected in step (b); and (f) storing the one or more activity records in the repository.

27. The method claim 21, wherein the tracking data is selected from the group consisting of:

data identifying the client site;

data identifying a client organization or a client facility;

data identifying a particular client system;

data identifying the released software product for which data is being collected;

data identifying a release level or version of the released software product;

data identifying customizations or setting applied to the released software product at the client site; and data identifying a particular module within the released software product.

28. The method of claim 21, wherein the tracking markers actively collect data during the operation of the released software product.

29. A method for improving a released software product, said method comprising the step of:
(a) activating tracking markers inserted at respective functional points of the released software product, wherein the activation of a tracking marker is manually triggered by user action that requests the initiation of a data collecting process and is received while the released software product is in operation at a client site;
(b) after the activation of the tracking markers, collecting tracking data through tracking markers inserted at respective functional points of the released software product, said tracking data being collected while the software product is in operation at the client site, the tracking data including data identifying the client site and data identifying an update comprising a software patch applied to the released software product at the client site after the software product was released by a vendor and installed on a client system at the client site;
(c) storing the tracking data collected in step (b) in a repository; and
(d) retrieving the tracking data from the repository and analyzing the tracking data to a vendor site to determine changes for improving the software product.

30. A computer system, comprising:
a processor; and
a program storage device readable by the computer system, tangibly embodying a program of instructions executable by the processor to:
(a) in accordance with a predefined value read from a control file stored at a client site, activate the tracking markers, the predefined value identifying when to activate the tracking markers to initiate a data collection process;
(b) collect tracking data through tracking markers inserted at respective functional points of a released software product, said tracking data being collected while the software product is in operation at the client site, the tracking data including data identifying the client site and data identifying an update comprising a software patch applied to the released software product at the client site after the software product was released by a vendor and installed on a client system at the client site;
(c) store the tracking data collected in step (c) in the repository; and
(d) retrieve the tracking data from the repository and analyzing the tracking data to a vendor site to determine changes for improving the software product.

31. A program storage device readable by a machine, tangibly embodying a program of instructions executable by the machine to machine to:
(a) in accordance with a predefined value read from a control file stored at a client site, activate the tracking markers, the predefined value identifying when to activate the tracking markers to initiate a data collection process;
(b) collect tracking data through tracking markers inserted at respective functional points of a released software product, said tracking data being collected while the software product is in operation at the client site, the tracking data including data identifying the client site and data identifying an update comprising a software patch applied to the released software product at the client site after the software product was released by a vendor and installed on a client system at the client site;
(c) store the tracking data collected in step (c) in the repository; and
(d) retrieve the tracking data from the repository and analyzing the tracking data at a vendor to determine changes for improving the software product.

32. An apparatus for improving a released software product, said apparatus comprising:
a released software product comprising one or more tracking markers at one or more functional points within the released software product,
a client system at a client site, the client system comprising a data repository and operable to activate the one or more tracking markers in accordance with a predefined value read from a control file stored in the data repository at a client site, collect tracking data while the released software product is in operation on the client system, and deposit the collected tracking data into the repository, the tracking data including data identifying the client site and data identifying an update comprising a software patch applied to the released software product at the client site after the software product was released by a vendor and installed on the client system at the client site; and
a vendor system comprising a tracking data analyzer, wherein the tracking data analyzer analyzes the collected tracking data to determine performance and utilization trends, and
wherein an update is applied to the released software product at the client site, and
wherein the predefined value identifies when to activate the tracking markers to initiate a data collection process.

33. The apparatus of claim 32, wherein the tracking marker is a module configured to collect predetermined types of data during operation of the software module.

34. The apparatus of claim 32, wherein collection of tracking data by a tracking marker is specified by logic included in the software product, for the tracking marker.

35. The apparatus of claim 32, wherein the tracking markers operate continuously to collect the tracking data.

36. The apparatus of claim 32, wherein the collected tracking data includes product performance data.

37. The apparatus of claim 32, wherein the collected tracking data includes product activity data.

38. The apparatus of claim 32, wherein the collected tracking data includes utilization data.

39. The apparatus of claim 32, wherein said tracking data analyzer analyzes the collected tracking data to acquire performance and utilization statistics.

40. The apparatus of claim 32, wherein said tracking data analyzer analyzes said communicated data to determine improvements for the software product.

41. The apparatus claim 32, wherein the tracking data further includes data selected from the group consisting of:
data identifying the client site;
data identifying a client organization or a client facility;
data identifying a particular client system;
data identifying the released software product for which data is being collected;
data identifying a release level or version of the released software product;
data identifying customizations or setting applied to the released software product at the client site; and
data identifying a particular module within the released software product.

42. The apparatus claim 32, wherein the tracking markers actively collect data during the operation of the released software product.

43. An apparatus for improving a released software product, said apparatus comprising:
- a data repository;
- a released software product comprising one or more tracking markers at one or more functional points within the released software product;
- a client system at a client site, the client system in communication with the data repository and operable to collect tracking data while the released software product is in operation on the client system, and deposit the collected tracking data into the repository, the tracking data including data identifying the client site and data identifying an update comprising a software patch applied to the released software product at the client site after the software product was released by a vendor and installed on the client system at the client site; and
- a vendor system comprising a tracking data analyzer, wherein the tracking data analyzer analyzes the collected tracking data to determine performance and utilization trends, wherein the collection of the tracking data by the tracking markers is initiated manually by user action that requests the initiation of a data collection process and is received while the released software product is operated at the client site, and wherein an update is applied to the released software product at the client site.

* * * * *